United States Patent
Wolff et al.

(10) Patent No.: US 9,267,063 B2
(45) Date of Patent: Feb. 23, 2016

(54) DUST SUPPRESSION FORMULAS USING PLASTICIZED CELLULOSE ETHERS

(71) Applicant: Benetech, Inc., Aurora, IL (US)

(72) Inventors: Andrew R. Wolff, Darien, IL (US); Michael T. Such, Woodridge, IL (US)

(73) Assignee: Benetech, Inc., Aurora, IL (US)

( * ) Notice: Subject to any disclaimer, the term of this patent is extended or adjusted under 35 U.S.C. 154(b) by 0 days.

(21) Appl. No.: 13/680,791

(22) Filed: Nov. 19, 2012

(65) Prior Publication Data

US 2014/0141162 A1    May 22, 2014

(51) Int. Cl.
- B05D 5/00 (2006.01)
- C09K 3/22 (2006.01)
- B08B 17/00 (2006.01)

(52) U.S. Cl.
CPC ... C09K 3/22 (2013.01); B05D 5/00 (2013.01); B08B 17/00 (2013.01)

(58) Field of Classification Search
USPC .................. 427/212, 221; 524/804, 521, 547; 252/88.1
See application file for complete search history.

(56) References Cited

U.S. PATENT DOCUMENTS

| | | |
|---|---|---|
| 1,910,975 A | 5/1933 | Wallace |
| 1,916,539 A | 7/1933 | Spencer |
| 2,204,781 A | 6/1940 | Wattles |
| 2,226,823 A | 12/1940 | Kropscott |
| 2,250,287 A | 7/1941 | Work et al. |
| 2,346,650 A | 4/1944 | Bomstein |
| 2,383,543 A | 8/1945 | Gray |
| 2,436,146 A | 2/1948 | Kleinicke et al. |
| 2,516,633 A | 7/1950 | Kesler et al. |
| 2,653,108 A | 9/1953 | Bruce |
| 2,854,347 A | 9/1958 | Booth et al. |
| 2,894,851 A | 7/1959 | Booth et al. |
| 3,337,312 A | 8/1967 | Perlus |
| 3,677,014 A | 7/1972 | Stout et al. |
| 3,708,319 A | 1/1973 | Nimerick et al. |

(Continued)

FOREIGN PATENT DOCUMENTS

| | | |
|---|---|---|
| CA | 2163972 A1 | 5/2007 |
| JP | 49-31589 S | 3/1974 |

(Continued)

OTHER PUBLICATIONS

"What Chemicals Are Used", FracFocus Chemical Disclosure Registry, Apr. 23, 2011, pp. 1-4.*

(Continued)

Primary Examiner — Erma Cameron
(74) Attorney, Agent, or Firm — Nixon Peabody LLP

(57) ABSTRACT

A method of treating a plurality of fines of a dusting material to prevent emanation of dust from the dusting material is described. An aqueous solution comprising a mixture of soluble non-ionic cellulose ether, a plasticizer, and a surfactant is provided. The aqueous solution is applied to a dusting material comprising a plurality of fines. The dusting material is transferred during the applying step from a first location to a second location as the aqueous solution is applied to the plurality of fines. The dusting material is mixed with the aqueous solution to coat the plurality of fines with the aqueous solution. The treated dusting material is accumulated into a mass of the material subsequent to the applying step wherein the aqueous solution is substantially evenly distributed throughout an interior portion of the mass of the treated dusting material.

20 Claims, 1 Drawing Sheet

(56) References Cited

U.S. PATENT DOCUMENTS

| | | | |
|---|---|---|---|
| 3,711,318 A | 1/1973 | Trechook et al. | |
| 3,766,077 A | 10/1973 | Hwa et al. | |
| 3,954,662 A | 5/1976 | Sawyer et al. | |
| 4,055,471 A | 10/1977 | Beck et al. | |
| 4,087,572 A | 5/1978 | Nimerick | |
| 4,169,170 A | 9/1979 | Doeksen | |
| 4,214,875 A | 7/1980 | Kromley | |
| 4,238,536 A | 12/1980 | Koch et al. | |
| 4,264,333 A | 4/1981 | Shaw et al. | |
| 4,269,721 A | 5/1981 | Mueller et al. | |
| 4,316,811 A | 2/1982 | Burns et al. | |
| 4,326,962 A | 4/1982 | Jones et al. | |
| 4,369,121 A * | 1/1983 | Callahan et al. | 299/12 |
| 4,376,700 A | 3/1983 | Irons | |
| 4,380,459 A | 4/1983 | Netting | |
| 4,400,220 A | 8/1983 | Cole, Jr. | |
| 4,417,992 A | 11/1983 | Bhattacharyya et al. | |
| 4,427,719 A | 1/1984 | Moore | |
| 4,428,984 A | 1/1984 | Shimizu et al. | |
| 4,468,232 A | 8/1984 | Funk | |
| 4,469,612 A | 9/1984 | Fenton | |
| 4,501,593 A | 2/1985 | Paersch et al. | |
| 4,510,081 A | 4/1985 | Bronner et al. | |
| 4,551,261 A | 11/1985 | Salihar | |
| 4,561,905 A | 12/1985 | Kittle | |
| 4,582,511 A * | 4/1986 | Siddoway et al. | 44/577 |
| 4,594,268 A | 6/1986 | Kirwin | |
| 4,642,196 A | 2/1987 | Yan | |
| 4,650,598 A | 3/1987 | Roberts et al. | |
| 4,693,755 A * | 9/1987 | Erzinger | 134/4 |
| 4,737,305 A | 4/1988 | Dohner | |
| 4,746,543 A | 5/1988 | Zinkan et al. | |
| 4,778,615 A | 10/1988 | Jeglic | |
| 4,780,233 A | 10/1988 | Roe | |
| 4,801,635 A | 1/1989 | Zinkan et al. | |
| 4,810,405 A | 3/1989 | Waller et al. | |
| 4,824,589 A | 4/1989 | Magyar et al. | |
| 4,828,576 A | 5/1989 | Bixel et al. | |
| 4,836,945 A | 6/1989 | Kestner | |
| 4,867,613 A * | 9/1989 | McLeod et al. | 405/263 |
| 4,877,418 A | 10/1989 | Goleczka et al. | |
| 4,897,218 A | 1/1990 | Roe et al. | |
| 4,960,532 A | 10/1990 | Kremer | |
| 4,971,720 A | 11/1990 | Roe | |
| 4,981,398 A | 1/1991 | Field et al. | |
| 5,024,783 A | 6/1991 | Busch et al. | |
| 5,028,238 A | 7/1991 | Von Rybinski et al. | |
| 5,128,178 A | 7/1992 | Roe | |
| 5,143,645 A | 9/1992 | Roe | |
| 5,176,832 A | 1/1993 | Dorta et al. | |
| 5,192,337 A | 3/1993 | Wajer et al. | |
| 5,194,174 A * | 3/1993 | Roe et al. | 404/76 |
| 5,223,165 A | 6/1993 | Winstanley et al. | |
| 5,256,444 A | 10/1993 | Roe | |
| 5,271,859 A * | 12/1993 | Roe | 404/76 |
| 5,302,308 A | 4/1994 | Roe | |
| 5,310,494 A | 5/1994 | Bennett | |
| 5,328,497 A | 7/1994 | Hazlett | |
| 5,328,942 A | 7/1994 | Akhtar et al. | |
| 5,383,952 A | 1/1995 | Singewald et al. | |
| 5,409,626 A | 4/1995 | Muth | |
| 5,415,795 A | 5/1995 | Roe | |
| 5,436,429 A | 7/1995 | Cline | |
| 5,443,650 A | 8/1995 | Saska et al. | |
| 5,466,294 A | 11/1995 | Kearney et al. | |
| 5,527,482 A | 6/1996 | Pullen et al. | |
| 5,530,596 A | 6/1996 | Fukino et al. | |
| 5,536,429 A | 7/1996 | Bennett et al. | |
| 5,576,056 A | 11/1996 | Roe | |
| 5,578,239 A | 11/1996 | Bennett | |
| 5,595,782 A | 1/1997 | Cole | |
| 5,658,486 A | 8/1997 | Rogers et al. | |
| 5,681,878 A | 10/1997 | Kiotzsche et al. | |
| 5,820,787 A | 10/1998 | McNabb et al. | |
| 5,849,364 A | 12/1998 | Nachtman et al. | |
| 5,863,456 A | 1/1999 | Pullen | |
| 5,876,622 A | 3/1999 | Pullen et al. | |
| 5,968,222 A | 10/1999 | Kodali | |
| 6,086,647 A | 7/2000 | Rahm et al. | |
| 6,124,366 A | 9/2000 | Pullen et al. | |
| 6,372,842 B1 | 4/2002 | Grisso et al. | |
| 6,409,818 B1 | 6/2002 | Johnson | |
| 6,790,245 B2 | 9/2004 | Wolff et al. | |
| 6,846,502 B1 | 1/2005 | Billmers et al. | |
| 7,157,021 B2 | 1/2007 | Bytnar et al. | |
| 7,854,857 B2 | 12/2010 | Wynne et al. | |
| 7,976,724 B2 | 7/2011 | Wolff | |
| 2003/0066456 A1 | 4/2003 | Langford | |
| 2004/0065198 A1 | 4/2004 | Wolff et al. | |
| 2004/0195545 A1 | 10/2004 | Gay et al. | |
| 2004/0227126 A1 | 11/2004 | Wynne et al. | |
| 2010/0140539 A1 | 6/2010 | Weagle et al. | |
| 2010/0301266 A1 * | 12/2010 | Marsden et al. | 252/88.1 |

FOREIGN PATENT DOCUMENTS

| | | | |
|---|---|---|---|
| JP | 59-174695 S | | 10/1984 |
| JP | 2006-199837 A | | 8/2006 |
| JP | 199837 | * | 8/2006 |
| JP | 2006199837 A | | 8/2006 |
| RU | 2061641 C1 | | 6/1996 |
| SU | 1101445 A | | 7/1984 |
| WO | 82-00650 A1 | | 3/1982 |
| WO | 99-24020 A1 | | 5/1999 |
| WO | 00-34200 A1 | | 6/2000 |
| WO | 01-81008 A2 | | 11/2001 |

OTHER PUBLICATIONS

Prenzno, "The World of Cellulose Gums", Virgo Publishing, Food Product Design, May 18, 2011, pp. 1-2.*

CAS Registry file of 9004-67-5, entered STN Nov. 16, 1984.*

Dow Corporation; "Methocel: Effect of Plasticizers on Film Properties in Tablet Coatings"; retrieved from http://dowwolff.custhelp.com/answers/detail/a_id/2357/~/methocel-effect-of-plasticizers-on-film-properties-in-tablet-coatings (4 pages).

Park, H.J., et al.; "Permeability and Mechanical Properties on Cellulose-Based Edible Films"; Journal of Food Science, vol. 58, No. 6; pp. 1361-1364; 1993.

EG&G Berthold; "Sugar Production: Massflow and Concentration Measurements, and Level Switching"; retrieved from http://www.bertolhd.com.au/industrial_pages/sugar%production.html; Jul. 8, 2002.

Anonymous; "The origins of Molasses"; retrieved from http://www.melasse.de/english/herkunft.html on Jul. 8, 2002.

Anonymous, SvG Intermol; "Dust Buster"; retrieved from http://www.svgintermol.com/products/product_pages/pr_dust_buster.htm; Apr. 15, 2002.

International Search Report for PCT/US94/06027 mailed Jul. 21, 1994.

Anonymous; "Molasses: New uses for industry and the environment"; PROSI Magazine-Jun. 1999, No. 365, Sugar Industry; retrieved from http://www.prosi.net/mag99/365june/molas365.htm; Apr. 15, 2002 (4 pages).

Anonymous; Organisation for Economic Co-operation and Development (OECD) Environmental Health and Safety Publications, Series on the Safety of Novel Foods and Feeds No. 3; Consensus Document on Compositional Considerations for New Varieties of Sugar Beet: Key Food and Feed Nutrients and Antinutrients; Feb. 1, 2002; (26 pages).

Anonymous, Pennsylvania Dairy Herd Improvement Association; "Question: Is there a place to use molasses in our TMR?"; retrieved from http://www.dhia.psu.edu/DtoDApril14.htm; Apr. 15, 2002 (1 page).

Curtin, Dr. Leo V.; "Molasses—General Considerations," from "Molasses in Animal Nutrition"; National Feed Ingredients Association, West Des Moines, Iowa; 1983 (11 pages).

Dow Chemical Corporation; "Methocel Cellulose Ethers Technical Handbook," published Sep. 2002; retrieved from http://msdssearch.dow.com/PublishedLiteratureDOWCOM/dh_004f/

(56) References Cited

OTHER PUBLICATIONS

0901b8038004fa1b.pdf?filepath=methocel/pdfs/noreg/192-01062.pdf&fromPage=GetDoc (32 pages).
Anonymous, Monitor Sugar Company; "The Sugar Production Process; Molasses Storage and Shipping; Crystallization and Centrifugation; Evaporation; Drying and Granulation"; retrieved from http://www.monitor-sugar.com; Jul. 8, 2002 (8 pages).
Perez, Rena; "Molasses: Extract from FAO Tropical Database"; Tropical Foods and Feeding Systems; pp. 233-239; date unknown (7 pages).
Anonymous; Research Disclosure document 276, 237: "Process for Suppression of Coal Dust"; Apr. 1987 (4 pages).
Rosen, Milton; "Surfactants and Interfacial Phenomena, 2d Ed.": Wiley Interscience Publications (1989), pp. 207-239, 240-275, 276-303, and 337-362.
Tutumluer, Erol, et al.; "Laboratory Characterization of Coal Dust Fouled Ballast Behavior": AREMA 2008 Annual Conference & Exposition; Sep. 21-24, 2008; Salt lake City, Utah (31 pages).
International Search Report for PCT/US2013/037620 mailed Jul. 29, 2013.
Written Opinion of International Searching Authority for PCT/US2013/037620 mailed Jul. 29, 2013.

* cited by examiner

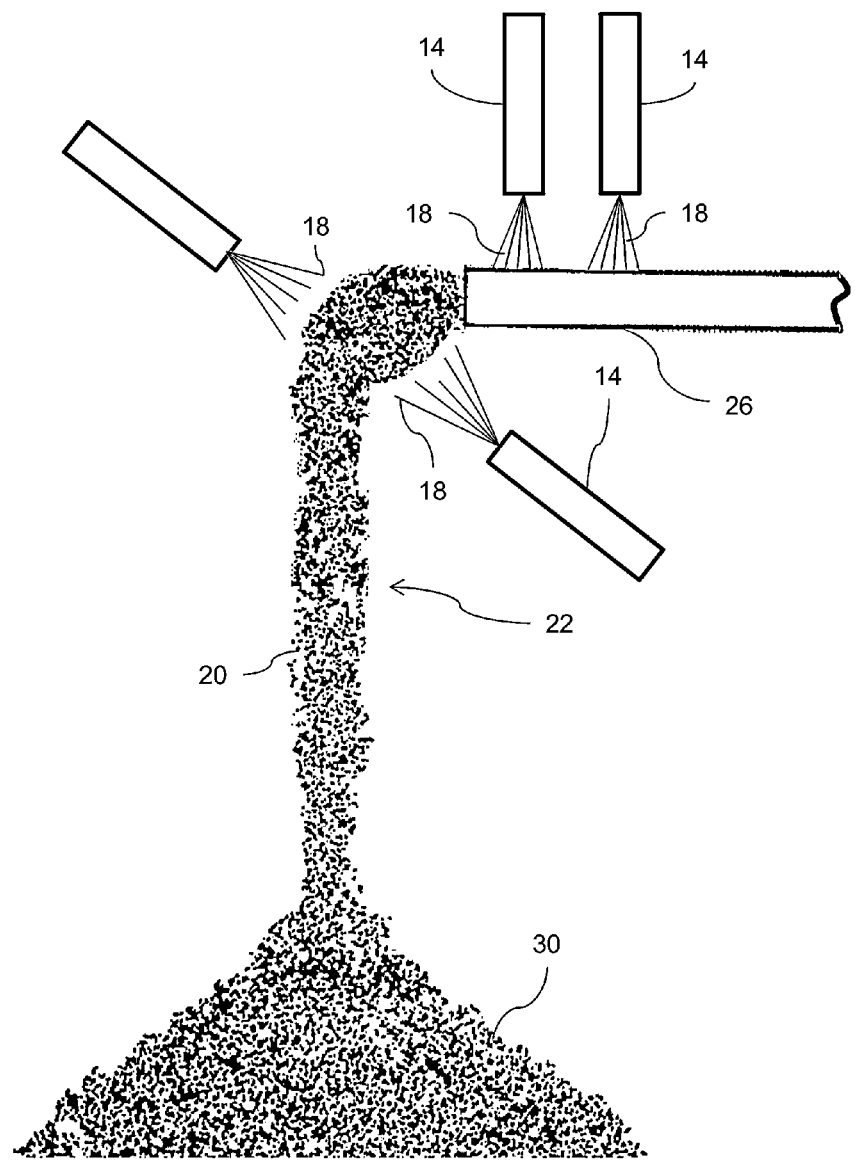

DUST SUPPRESSION FORMULAS USING PLASTICIZED CELLULOSE ETHERS

CROSS-REFERENCE TO RELATED APPLICATIONS

N/A

FEDERALLY SPONSORED RESEARCH OR DEVELOPMENT

N/A

TECHNICAL FIELD

The invention relates to suppression of dust; more particularly, the present invention relates to an unexpectedly effective aqueous solution of a soluble cellulose ether, a plasticizer, and one or more surfactants and mixing a dusting material with the aqueous solution, thereby reducing or eliminating the ability of the dusting material to generate dust during routine handling.

BACKGROUND OF THE INVENTION

The generation of dust during transport and handling of material has long been recognized as an economic loss and a health hazard. In general there are four ways to prevent dust generation using a chemical solution. Two are temporary: using foam to form a physical blanket over the material, usually when it is on a conveyor belt, or using surfactants in water to wet the dusting material and prevent dust generation through multiple handling points. These remedies last only as long as the foam remains intact or the material remains wet. The second two approaches focus on longer-term dust control. They involve applying a chemical binder to the surface of a stock pile or railcar to form a crust, preventing wind-born loss, or to treat the entire mass of material with a binder, cementing the smaller dust particles to larger particles on a semi-permanent basis. The former approach, depending on the choice of binder, can form a crust lasting over a year. The latter, depending on the choice of binder, can render a dusting material effectively non-dusting for a time ranging from days to months. We report here an improvement of the latter technology.

There have been any number of compositions put forth over many decades to address this. Most of these center around handling coal. As early as 1931, Wallace (U.S. Pat. No. 1,910,975) taught the application of hygroscopic sugary materials such as molasses to prevent dusting in coal. Of greater note is Work et. al.'s (U.S. Pat. No. 2,250,287) 1940 recognition that a " . . . strong, abrasion-resistant coating . . . " was preferred as a dust-proofing agent for coal. While the use of calcium chloride and other hygroscopic salts to retain moisture on coal had been previously taught, in 1943 Kleinicke et al. (U.S. Pat. No. 2,436,146) added organic gels such as starch, gelatin, or agar to enhance the performance of these salts. More recently, Trechock et al. (U.S. Pat. No. 3,711,318) taught the use of film-forming compositions including sodium silicate, asphalt, coal tar, and molasses to substantially reduce <325 mesh dust production on coke briquettes. In 1974, Salyer et al. (U.S. Pat. No. 3,954,662) taught the use of copolymers of vinyl esters and unsaturated dicarboxylic acids and anhydrides with wetting agents to suppress dust on coal. Beck et al. (U.S. Pat. No. 4,055,471) reported the use of waste sulfite liquor (lignosulfonates) to suppress dust on coal before feeding it to a coking oven. It is worth noting that at about this time, Callahan et al. (U.S. Pat. No. 4,369,121) reported the use of water-soluble nonionic cellulose ethers to form a pile seal over the surface of stockpiles, however he did not teach the use of this composition as a dust-proofing agent for treating the bulk of the aggregate, nor did his composition contain a plasticizer. Shimizu et al. (U.S. Pat. No. 4,428,984) later taught the use of a polyhydridic alcohol; preferably glycerin, and a wetting agent as a dust-reducing treatment. Fenton (U.S. Pat. No. 4,469,612) taught the use of polyacrylates and copolymers of acrylics as dust agglomerating agents specifically for use with oil-shale derived fines. Kittle (U.S. Pat. No. 4,561,905) taught the use of foamed heavy process oil to suppress coal dust. At almost the same time, Siddoway et al. (U.S. Pat. No. 4,582,511) taught the use of sugar or molasses as a body treatment top suppress coal dust. Yan's (U.S. Pat. No. 4,462,196) use of a gelatinized starch illustrates yet another possible composition for suppressing coal dust. Roberts et al. (U.S. Pat. No. 4,650,598) taught the advantage of adding a small amount of a polyacrylate or polymethacrylate to kerosene in an oil in water emulsion for dust control on coal. This is very similar to Roe's (U.S. Pat. No. 4,780,233) teaching of using polyisobyutlyene to enhance the effectiveness of oil in an oil in water emulsion for dust control. The two previous patents taught the use of kerosene or mineral-based oils and this contrasts with Zinkan's (U.S. Pat. No. 4,801,635) approach of using anionic and nonionic water soluble (non-cellulosic) polymers with a wetting agent. Returning to petroleum-based compositions, Wajer et al. (U.S. Pat. No. 5,192,337) taught the use of petroleum resin diluted with mineral oil to reduce dusting on coal. Roe et al. (U.S. Pat. No. 5,194,174), at roughly the same time, taught the use of polyvinyl alcohol with cross-linkers, wetting agents, and plasticizers for dust control. Of particular note is the work of Winstanley et al. (U.S. Pat. No. 5,223,165), which teaches the use of alkyl glycosides for dust control. While the alkyl glycosides are wetting agents and the focus of the patent, the use of hydrophilic binders including cellulose derivatives in combination with the wetting agents is taught. Again, nowhere is there any mention of the use of a plasticizer to enhance dust suppression. Roe (U.S. Pat. No. 5,271,859) discussed dust control methods at high temperature; that is, greater than 250° F., using nonionic cellulose ethers. There are additional patents covering the use of a variety of binders to render materials non dusting. Included in that list would be teachings related to the use of cationic polymers (Roe, U.S. Pat. No. 5,256,444); lignosulfonate plus additives (Bennet, U.S. Pat. No. 5,310,494; U.S. Pat. No. 5,578,239); hydrated grain endosperm (Rogers et al., U.S. Pat. No. 5,658,486); distillation bottoms from 1,6-hexanediol production (McNabb et al., U.S. Pat. No. 5,820,787); and molasses and oil or simply molasses protein (Rahm et al., U.S. Pat. No. 6,086,647; Wolff et al., U.S. Pat. No. 6,790,245).

From the references set forth above, it is apparent that there are a variety of options available to render a material non-dusting. However the majority of the above treatments rely on a strong binder to perform their function. As was taught by Work et al. in 1940, strength is essential as it relates to the basic mechanism by which dust is suppressed. Dust is suppressed when a composition binds the loose particles of the bulk material together. The stronger the bond between the bulk material particles, the less likely dust will separate from the substrate on mechanical agitation.

Of note to this disclosure is Roe's (U.S. Pat. No. 5,271,859) teaching of the use of water-soluble cellulose ethers with an additional wetting agent or plasticizer at temperatures above 250° F. as a dust palliative. In particular, Roe's claimed invention specifically calls for the addition of either a plasticizer or a wetting agent but not both.

Water-soluble cellulose ethers are well-known in the coatings industry. Their behavior with plasticizers has been studied extensively. As long ago as 1940 it was recognized that the addition of a plasticizer weakened the tensile strength of cellulose ether films (Kropscott, U.S. Pat. No. 2,226,823). Oakley (U.S. Pat. No. 2,653,108) made a similar observation. More recently Part et al. (Park, H. J., Weller, C. L., Vergano, P. J., and Testin, R. F.; Journal of Food Science, 58, #6, 1993 pp 1361-1364) quantified the same behavior specifically in methyl cellulose and hydroxypropyl methyl cellulose using, among other plasticizers, propylene glycol and glycerin (2,3-hydroxy-1-propanol). A DOW Corporation website discusses not only strength, but film toughness and Young's Modulus (http://dowwolff.custhelp.com/app/answers/detail/a_id/2357/~/methocel-effect-of-plasticizers-on-film-properties-in-tablet-coatings). In every case the addition of glycerin or propylene glycol weakened the films. It is therefore a surprising and unexpected result that the addition of a plasticizer to dust control formulas similar to those described by Roe would result in improved strength.

The present invention is provided to solve the problems discussed above and other problems, and to provide advantages and aspects not provided by prior dust suppression fluids of this type. A full discussion of the features and advantages of the present invention is deferred to the following detailed description, which proceeds with reference to the accompanying drawings.

SUMMARY OF THE INVENTION

An aspect of the present invention is directed to method of reducing airborne dust emanating from a plurality of fines of a dusting material. The method comprises the steps of (1) providing a source of an aqueous solution comprising a mixture of water soluble cellulose ether, a plasticizer, and one or more surfactants; (2) applying the aqueous solution to a dusting material comprising a plurality of fines to create a treated dusting material; and (3) mixing the dusting material with the aqueous solution to coat the plurality of fines with the aqueous solution. The method may further comprise the steps of (1) transferring the dusting material during the applying step wherein the dusting material is being transferred from a first location to a second location as the aqueous solution is applied to the plurality of fines, and/or (2) accumulating the plurality of fines of the treated dusting material into a mass of the dusting material subsequent to the applying step wherein the aqueous solution is substantially evenly distributed throughout an interior portion of the mass of the treated dusting material. The mixing step can be performed simultaneously with the accumulating step.

The aqueous solution may have the following properties. The soluble cellulose ether may be a non-ionic cellulose ether, and the plasticizer may be glycerin. The non-ionic cellulose ether may have a viscosity between 3 cPs and 100,000 cPs as measured at a concentration of 2.5 percent in water. The non-ionic cellulose ether may be a hydroxypropyl methylcellulose ether. A percentage of the non-ionic cellulose ether is no more than 20 percent by weight of the aqueous solution. A percentage of the plasticizer in the aqueous solution may be no more than 200 percent weight of the non-ionic cellulose ether.

Another aspect of the present invention is directed to a method of treating a plurality of fines of a dusting material to prevent emanation of dust from the dusting material. This method comprises the steps of (1) providing an aqueous solution comprising a mixture of soluble non-ionic cellulose ether, a plasticizer, and a surfactant; (2) applying the aqueous solution to a dusting material comprising a plurality of fines to create a treated dusting material; and (3) accumulating the plurality of fines of the dusting material into a mass of the dusting material subsequent to the applying step wherein the aqueous solution is substantially evenly distributed throughout an interior portion of the mass of the dusting material. The method may further comprise the steps of (1) mixing the dusting material with the aqueous solution to coat the plurality of fines with the aqueous solution, and or (2) transferring the dusting material during the applying step wherein the dusting material is transferred from a first location to a second location as the aqueous solution is applied to the plurality of fines.

The aqueous solution may have one or more of the following properties, alone or in any reasonable combination. The non-ionic cellulose ether is an alkyl-substituted cellulose ether. The plasticizer may be selected from a group of cellulose ether plasticizers consisting of polyols, diols, sugars, fatty acids, fatty acid esters, and polyhydridic alcohols. The plasticizer may be selected from a group consisting of diethylene glycol, propylene glycol, glycerin, triethanolamine, dextrose, and pentaerythritol. The surfactant may be selected from the group consisting of surfactants known to be effective on the dusting material to be treated. The non-ionic cellulose ether may be is at least a partially substituted hydroxy-alkyl cellulose ether. The hydroxy-alkyl cellulose ether may be hydroxypropyl cellulose ether or hydroxyethyl cellulose ether. The plasticizer may be selected from a group of known cellulose ether plasticizers. The plasticizer may be selected from the group consisting of alkylene glycols, dialkylene glycols, sugars, and glycerin. The plasticizer may be selected from the group consisting of propylene glycol, diethylene glycol, and glycerin. The surfactant may be selected from the group consisting of solutions of salts of alkylbenzene sulfonates, dialkyl sulfosuccinates, fatty acid amides, quaternary ammonium compounds, organic phosphate esters, ethylene oxide-propylene oxide block copolymers, nonionic fatty acid alcohol ethoxylates, nonionic fatty acid alcohol mixed ethoxylate-propoxylates, synthetic alcohol ethoxylates, and synthetic alcohol mixed ethoxylate-propoxylates. The surfactant may be selected from the group consisting of solutions of salts of alkylbenzene sulfonates, dialkyl sulfosuccinates, nonionic fatty acid alcohol ethoxylates, and synthetic alcohol ethoxylates. A cross-linking agent may be added to the formulation. The cross-linking agent may be glyoxal or glutaraldehyde Another aspect of the present invention is directed to a method of treating a plurality of fines of a dusting material to prevent emanation of dust from the dusting material. The method comprises the steps of: (1) providing an aqueous solution comprising a mixture of soluble non-ionic cellulose ether, a plasticizer, and a surfactant; (2) applying the aqueous solution to a dusting material comprising a plurality of fines to create a treated dusting material; (3) transferring the dusting material during the applying step wherein the dusting material is transferred from a first location to a second location as the aqueous solution is applied to the plurality of fines; (4) mixing the dusting material with the aqueous solution to coat the plurality of fines with the aqueous solution; and (5) accumulating the plurality of fines of the treated dusting material into a mass of the treated dusting material subsequent to the applying step wherein the aqueous solution is substantially evenly distributed throughout an interior portion of the mass of the treated dusting material.

The aspects of the invention described above include use of non-ionic cellulose ether solutions with a plasticizer and surfactant to reduce or eliminate the ability of a dusting material to generate dust for extended periods of time, for example during transport and handling and/or when transport and handling occurs several weeks after treatment. The solution may be applied at a rate of between 0.005 gallons per ton and 0.2 gallons per ton, preferably 0.02-0.03 gallons per ton.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a schematic of a plurality of fines of a dusting material as it is transferred from a first location to a second location along a conveyor while simultaneously treated with an aqueous liquid solution of the present invention and accumulated into a mass of non-dusting material subsequent to application of the aqueous solution wherein the aqueous solution is substantially evenly distributed throughout an interior portion of the mass of non-dusting material.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to an unexpectedly effective method for treating a mass of dusting material to suppress the generation of dust therefrom during handling and storage, the mass of dusting material having, prior to treatment, the propensity to generate dust during routine handling. The method comprises applying to the dusting material an aqueous solution comprising a mixture of soluble cellulose ether, a plasticizer, and one or more surfactants and thoroughly mixing the dusting material with the aqueous solution, thereby reducing or eliminating the ability of the dusting material to generate dust during routine handling.

The invention described herein is a significant and unexpected improvement in the strength of water-based dust control treatments produced using water-soluble cellulose ethers. The previous work, specifically Roe in the '859 patent, taught the use of water soluble cellulose ethers as binders, albeit at higher temperatures than are contemplated in this application. As discussed above, the addition of a plasticizer would only be expected to weaken a binding agent and thus the use of a plasticizer would have been viewed as a detriment to the best achievable binding strength of a dust control formulation. However, contrary to expectations, adding a plasticizer instead actually strengthens the particle-to-particle adhesion formed in these applications. Water-soluble cellulose ether formulations containing plasticizers and surfactants are found to offer a significant improvement in strength and reduction of dusting when compared to similar formulas which lack plasticizers.

The majority of the present work has been performed on coal. However, one skilled in the art will recognize that this invention is equally applicable to a wide range of dusting bulk materials, examples of which include, and are not limited to: taconite, limestone, crushed rock, gravel, sand, gypsum, cement, ash, petroleum and metallurgical coke, wood chips, and a variety of industrial ores.

The present invention relates to the use of water-soluble cellulose ethers to bind dust when applied to a variety of materials. In general, water-soluble cellulose ethers are dispersed in water and stirred until fully hydrated, producing a homogeneous solution. The plasticizer and surfactant are added at any point during the manufacturing step and the material is usually diluted and sprayed onto a flowing mass of dusting material.

The first step, dispersing and hydrating the cellulose ether can be accomplished in a number of ways as detailed in the "Methocel Cellulose Ethers Technical Handbook" available from Dow's web site: (http://www.dow.com/webapps/lit/litorder.asp?filepath=methocel/pdfs/noreg/192-01062.pdf&pdf=true). It was discovered to be particularly convenient to use a powder eductor such as the devices offered by Compatible Components (www.cccmix.com) to disperse cellulose ether powders.

The class of cellulose ethers includes methylcellulose, ethyl cellulose, hydroxyethyl cellulose, hydroxypropyl cellulose, hydroxyethyl methylcellulose, hydroxypropyl methylcellulose, and generally hydroxyalkyl methylcellulose such as those sold by Dow Chemical Corporation under the trade name METHOCEL®. Methylcellulose was discovered to be very effective in this technology, and particularly the moderate viscosity materials that would form a 4,000 cPs viscosity solution at 2.5 wt. %. At the same time, lower viscosity hydroxypropyl methylcellulose, such as material that will form a 400 cPs solution at 2.5 wt. %, can be equally effective if employed at slightly greater concentrations. Viscosity for cellulose ethers is generally used to define different molecular weights. Thus, a 400 cPs methylcellulose will have a viscosity of 400 cPs at a concentration of 2.5%, and a 4000 cPs methylcellulose will have a viscosity of 4,000 cPs at a concentration of 2.5%. Lower concentrations will have lower viscosities. It was discovered that the strengthening effect of plasticizers does not extend to anionic carboxymethylcellulose.

A number of different plasticizers, including diethylene glycol, propylene glycol, glycerin, triethanolamine, dextrose, and pentaerythritol have been tested, and every indication is that this is a general phenomenon of all plasticizers in this application. From an economic standpoint, obviously, some of these plasticizers will be more cost effective. In particular, glycerin has been found to be effective and abundant in the current market as it is a byproduct from biodiesel production. As markets change, and particularly as glycerin becomes a preferred chemical feedstock, we expect diethylene glycol and dextrose to remain economically viable alternatives to glycerin.

The use of a cross-linking agent, glyoxal, has been examined in these systems, and a further increase in strength for crusts was produced and observed in this manner. This was expected, and similar improvements to the strength with other cross-linking systems such as borates or zirconium salt-based cross-link systems would be further expected.

Wetting agents are essential to insure the efficient coverage of the cellulose ether solution onto the dusting material. This area of dust control is well-understood by those of ordinary skill in the art, and solutions of salts of alkylbenzene sulfonates, dialkyl sulfosuccinates, fatty acid amides, quaternary ammonium compounds, organic phosphate esters, non-ionic fatty acid alcohol ethoxylates and mixed ethoxylate-propoxylates, as well as synthetic alcohol ethoxylates and mixed ethoxylate-propoxylates have all been used in the past.

Commercial preparations are available from a number of manufacturers, and in the present invention materials produced by Benetech, Inc., of Aurora, Ill. were used. The inventors contemplate that cationic, anionic, or nonionic surfactants are chemically compatible in combination with other aspects of this invention.

The addition of insoluble reinforcing agents are anticipated to be as effective in these formulations as they are in non-plasticized cellulose ether formulas.

The application rate for the mixture can vary widely. In general, more is better, but at some point maximum dust control is achieved and adding additional binding agent has no performance benefit and an economic penalty. Thus, application rates between 0.005 gallons of the concentrated non-ionic cellulose ether solution per ton and 0.2 gallons per ton will all generally provide adequate short-term and long-term dust suppression. It was discovered that more effective application rates were between 0.01 gallons per ton and 0.05 gallons per ton. Most effective application rates were generally in the range of 0.02 gallons per ton to 0.03 gallons per ton.

As explained above, the formula of the present invention is a method of using a solution to reduce airborne dust from a dusting material. The solution comprises a non-ionic cellulose ether, a surfactant and water. A plasticizer is added to the liquid solution prior to drying the liquid solution on the dusting material. The non-ionic cellulose ether preferably has a viscosity between 3 cPs and 100,000 cPs when measured at a concentration of 2.5 percent in water, and more preferably between 50 cPS and 10,000 cPS, e.g., a hydroxypropyl methylcellulose ether having the prescribed viscosity and making up no more than 20 percent by weight of the solution. The plasticizer is preferably glycerin at no more than 200 percent weight of the non-ionic cellulose ether.

Thus, a typical formula is produced by dispersing 650 lbs of low viscosity (about 400 cPS for a 2.5% solution) hydroxypropyl methylcellulose in a 4,150 gallon water solution containing 145 lbs of glycerin and adding approximately 850 gallons of a commercial dust wetting formulation such as BT-205W (supplied by Benetech, Inc. of Aurora, Ill.). The solution is stirred for two hours to insure complete hydration of the cellulose ether then applied to a dusting material at a rate of 0.03 gallons per ton

EXAMPLES

Example 1

Measurement of Strength for Plasticized and Non-Plasticized Cellulose Ether Formulations To a sample of damp 18 mesh to 60 mesh (1 mm-0.25 mm) sub-bituminous coal was added a solution of 1.5 wt. % 400 cPs hydroxypropyl methylcellulose (HPMC). The solutions contained 1.0 wt. % commercial coal wetting solution concentrate (BT-205W supplied by Benetech, Inc.). The solution also contained plasticizers of the indicated composition. The amount added was such that the total mass of the sample was comprised of 20 wt. % or 25 wt. % of the solution with the remaining 80 wt. % or 75 wt. % coal. The samples were mixed and pressed into 30 mm diameter round plastic forms with a depth of 15 mm. The samples were heated to 40° C. overnight and in the morning cooled and broken using a force gauge. The maximum force required (in milliNewtons) to break the sample was divided by the mass of the sample (in grams) to give a specific strength that was independent of the mass of the sample. Results are shown in Table 1, with the lowest strength measurements underlined and the highest strength measurements double underlined. The combined results are simply the average of all 26 tests:

TABLE 1

Specific Strengths of Coal-HPMC Articles after Drying

| Composition | 20% Solution Addition (9 Samples) | 25% Solution Addition (17 Samples) | Combined Results |
|---|---|---|---|
| 1.5% HPMC Solution, no Plasticizer | 1827.1 mN/g | 2326.1 mN/g (15 samples) | 2139.0 mN/g (24 samples) |
| 1.5% HPMC Solution + 0.5% Pentaerythrytol | 2428.2 mN/g | 3604.6 mN/g | 3197.4 mN/g |
| 1.5% HPMC Solution + 0.5% Triethanolamine | 2369.92 mN/g | 2756.50 mN/g | 2622.7 mN/g |
| 1.5% HPMC Solution + 0.5% Glycerin | 2205.6 mN/g | 2587.2 mN/g | 2455.1 mN/g |
| 1.5% HPMC Solution + 0.25% Glycerin | 2572.9 mN/g | 2747.6 mN/g | 2687.1 mN/g |
| 1.5% HPMC Solution + 0.5% Propylene glycol | 2672.93 mN/g | 2915.96 mN/g | 2831.8 mN/g |
| 1.5% HPMC Solution + 0.5% Diethylene Glycol | 2617.3 mN/g | 2912.9 mN/g | 2810.6 mN/g |
| 1.5% HPMC Solution + 0.5% Dextrose | 2328.2 mN/g | 2816.7 mN/g | 2647.6 mN/g |

As can be seen, in all cases the addition of a plasticizer strengthened the articles. The clear implication is that when these solutions are applied to a substrate, the substrate treated using a cellulose ether and surfactant solution with a plasticizer will more strongly bind the dust particles than one treated with cellulose ether and surfactant solution without a plasticizer, or simply a cellulose ether solution.

Example 2

Examination of the Effect of Cellulose Ether Chemistry on the Strength of Coal-Dust Binding To a sample of 18 mesh to 60 mesh (1 mm-0.25 mm) sub-bituminous coal was added a solution of 1.5 wt. % of various cellulose ethers. The cellulose ethers were produced by Dow and their chemistry and nomenclature are discussed in the previously cited "Methocel Cellulose Ethers Technical Handbook" available from Dow's web site. All cellulose ethers were of the same viscosity grade: 4,000 cPs at a 2.5 wt. % solution. The chemistries ranged from "A" chemistry which was pure methylcellulose, through "E", "F", "J", and "K" chemistries. Of the hydroxypropyl-substituted cellulose ether chemistries it is worth noting that "F" chemistry has the least amount of hydroxypropyl substitution. The solutions contained approximately 22 wt. % commercial coal wetting solution concentrate (BT-205W supplied by Benetech, Inc.). The amount added was such that the total mass of the sample was comprised of 25 wt. % of the solution with the remaining 75 wt. % coal. The samples were mixed and pressed into 30 mm diameter round plastic forms with a depth of 15 mm. The samples were heated to 40° C. overnight and in the morning cooled and broken using a force gauge. The results are detailed in Table 2. Each result is the average of nine tests.

TABLE 2

| Chemistry | A | E | F | J | K |
|---|---|---|---|---|---|
| Breaking force | 84 N | 32 N | 38 N | 24 N | 20 N |

As can be seen, the "A" chemistry, that is, pure methylcellulose, produces a much stronger composite than any of the various hydroxypropyl-substituted methylcelluloses.

Example 3

Measurement of Strength for Plasticized and Non-Plasticized Sodium Carboxymethylcellulose Ether Formulations To a sample of dry fresh-ground 18 mesh to 60 mesh (1 mm-0.25 mm) sub-bituminous coal was added a solution of 4.0 wt. % sodium Carboxymethylcellulose (supplied by Ashland Chemical, Aqualon Division, type 7L). The solutions contained 0.5 wt. % commercial coal wetting solution concentrate (BT-210WF supplied by Benetech, Inc.). The solution also contained plasticizers of the indicated composition. The amount added was such that the total mass of the sample comprised 25 wt. % of the solution with the remaining 75 wt. % coal. The samples were mixed and pressed into 30 mm diameter round plastic forms with a depth of 15 mm. The samples were heated to 41° C. overnight and in the morning cooled and broken using a force gauge. The maximum force required (in Newtons) to break the sample was divided by the mass of the sample (in grams) to give a specific strength that was independent of the mass of the sample. Results are shown in table #3, and each number represents the average of nine samples.

TABLE 3

| Test solution | Specific Strength |
| --- | --- |
| 4% 7L CMC 0.5% 210WF | 13.10 N/g |
| 4% 7L CMC 0.5% 210WF, 0.8% glycerin | 12.10 N/g |
| 4% 7L CMC 0.5% 210WF 1.6% glycerin | 11.98 N/g |
| 4% 7L CMC 0.5% 210WF 0.8% diethylene glycol | 12.38 N/g |
| 4% 7L CMC 0.5% 210WF 1.6% diethylene glycol | 12.59 N/g |

As can be seen, and unlike nonionic cellulose ethers, we found no increase in strength for articles formed from carboxymethylcellulose with plasticizers, and possibly a slight decrease in strength. The higher strengths compared to the first example are attributed to the higher concentrations of sodium carboxymethylcellulose compared to HPMC discussed in the first example.

General Procedure for Evaluation of Crusts:

To further quantify the advantages of adding a plasticizer to dust-suppression formulas we examined the strength of non-compacted coal under conditions simulating dew, rain, and solar heating where the suppressant was applied to one surface and allowed to set. For examples 4-6, the procedure outlined herein was used to evaluate the strength of sub-bituminous coal to which the dust suppressant had been applied as a binder.

Sub-bituminous coal was sieved with the fraction less than one inch (25.4 mm) collected. The coal was moistened until visible surface moisture was present, roughly matching the surface moisture of fresh-mined coal. Three to six kilogram portions of this coal were taken and divided into samples of about 990 grams each. The samples were placed and loosely leveled (not compacted) in trays using disposable 8.5" diameter aluminum pie plates. The samples were labeled and treated at the noted rate with the test solutions. The samples were then allowed to dry overnight and subsequently deionized water was applied at the equivalent of about ¹/₂₀'th of an inch (~1 mm) of rain or heavy dew. The samples were again dried overnight and then wet with the equivalent of ¹/₁₀ inch of rain (2.5 mm) The samples were again allowed to dry and then heated under heat lamps to between 40° C. and 60° C. for four hours to simulate the effect of hot sun on the treated coal. Samples were cooled and the coal mass was broken using a force gauge fitted with a 9.5 mm blunt rod probe. The maximum force was recorded and the pieces were weighed to determine the mass of the sample bound. Using the density of the coal and the diameter of the sample, the thickness was then calculated.

Example 4

Addition of Plasticizer or Surfactant to HPMC

Solutions of 2.5% 400 cPs HPMC and 1.0% BT-205W were treated with either 1.0% BT-205W surfactant mixture (A) or 5.00% glycerin (B). The solutions were applied at an application rate of 0.024 gallons per square foot. Three trays of each solution with coal were prepared and treated as per the general procedure above to give the following results (Table 4):

TABLE 4

| Test | Thickness, in | Strength, psi |
| --- | --- | --- |
| Solution A (surfactant) | 0.41 | 112 |
| Solution B (plasticizer) | 0.49 | 116 |

As can be seen, the HPMC solution treated with the plasticizer gave greater thickness and strength measurements than the HPMC solution containing a surfactant solution.

Example 5

Addition of Plasticizer to HPMC and Surfactant Formula

Solutions of 1.5% 400 cPs HPMC and 1.0% BT-205W (A) and 1.5% 400 cPs HPMC with 1.0% BT-205W and 0.5% glycerin (B) at an application rate of 0.035 gallons per square foot were tested. Four trays of each solution with coal were prepared and treated as per the general procedure above to give the following results (Table 5):

TABLE 5

| Test | Thickness, in | Strength, psi |
| --- | --- | --- |
| Solution A | 0.26 | 64 |
| Solution B | 0.27 | 94 |

As can be seen, the addition of a plasticizer was effective in increasing the strength of the coal binding.

Example 6

The Benefit of Adding a Cross-Linker

Solutions of two different cellulose ethers were prepared. Solution A contained 1.5% 400 cPs HPMC, 0.50% glycerin, and 1.0% BT-205W. Solution B contained 1.5% 400 cPS HPMC, 0.50% glycerin, 1.0% BT-205W, 0.1% glyoxal solution (40%), and sufficient acetic acid to make the pH<5. Three trays of each solution with coal were prepared and treated as per the general procedure above at an application rate of 0.04 gallons per square foot to give the following results (Table 6):

TABLE 6

| Test | Thickness, in. | Strength, psi |
|---|---|---|
| Solution A | 0.80 | 74 |
| Solution B | 0.83 | 93 |

As can be seen, the addition of a cross-linking agent further strengthens the coal-coal binding.

Example 7

The Benefit of Adding a Plasticizer to Particle Agglomeration

A mixture of 228 grams of 18-60 mesh sub-bituminous coal was thoroughly mixed with 5.85 grams of sub-200 mesh sub-bituminous coal. Twenty gram samples of the mixture were removed and mixed with water, or a mixture of 1.5% 400 cPs HPMC and 21. BT-205W (Solution A), or a mixture of 1.5% 400 cPs HPMC and 21.% BT-205W and 0.5% glycerin (Solution B) at a rate of 3.3 grams of liquid per 20 grams of sub-bituminous coal mixture.

The samples were gently mixed with a steel spatula and placed in an oven at 40-41 C.° overnight. The following morning the samples were removed from the oven and sieved. The sieving system contained two sieve stacks allowing for two samples to be sieved simultaneously. All results represent duplicate size determinations (Table 7).

TABLE 7

| Retained on Sieve # | Sieve Size | Water | Soln. A (no plasticizer) | Soln. B (plasticizer) |
|---|---|---|---|---|
| 18 | 1,000 microns | 0.16% | 0.72% | 3.57% |
| 60 | 250 microns | 95.63% | 96.82% | 94.93% |
| Sub-60 | <250 microns | 4.21% | 2.46% | 1.50% |
| Total | | 100.00% | 100.00% | 100.00% |

As can be seen, the formula with plasticizer dramatically increased the amount of material greater than 1,000 microns when compared to the water-treated or the cellulose ether and surfactant without plasticizer-treated material. The less than 250 micron fraction was reduced by almost 40 percent simply by adding plasticizer.

From this we can conclude that the addition of a plasticizer to a soluble cellulose ether and surfactant mixture will significantly increase the formula's ability to reduce dust by more strongly binding dust particles to larger particles.

One of ordinary skill in the art would readily appreciate that the fluid solution of the present invention is used in a full body treatment of a dusting material. For example, a dust suppressant of the present invention may be sprayed on individual particles of the dusting material as they are transported on a conveyor. Again, the present invention treats individual fines of a dusting material. This is differentiated from a dust suppressant dried to form a crust over the exposed surface of a mass or pile of a dusting material, e.g. coal. The mass or pile of the dusting material may be within a railcar, a stockyard, or similar location. As used in the present application, the phrase "mass or pile of dusting material" refers particularly to any conglomeration of dusting material lumps or pieces. Thus, a crust formed over an exposed surface of a mass or pile of a dusting material differs materially from a full body treatment using a dust suppressant in which individual particles of dusting material are sprayed rather than an exposed surface of a mass of dusting material.

With reference to the accompanying drawing, the present invention also relates to a method of reducing airborne dust emanating from a plurality of fines of a dusting material and a method of treating a plurality of fines of a dusting material to prevent emanation of dust from the dusting material. Referring to FIG. 1, one or more applicators 14 spray a liquid solution 18 of the present invention onto a stream 20 of a dusting material 22 comprising a plurality of fines of the dusting material 22. The dusting material 22 is generally being processed on a conveyor or like apparatus 26 for transferring the dusting material 22 from one location to a second location. The solution 18 is generally applied to the moving stream of the dusting material 22, either on the transport apparatus 26 as shown or as the stream is transferred from the apparatus 26, also shown. Mixing between the fines and the solution 18 occurs as the stream 20 is transferred, and especially as the stream 20 is transferred from the transport apparatus and accumulated at a bulk location, such as into a mass or pile 30 of the dusting material 22. In the mass 30, the aqueous solution 18 is substantially evenly distributed throughout an interior portion of the mass of the dusting material 22. The solution 18 is dries within the mass which reduces or prevents emanation of airborne fines or dust particles from entering the surrounding atmosphere.

According to the methods and aspects of the invention, airborne dust is reduced or eliminated during transport and handling of the dusting material, often more than 24 hours after treatment with the solution according to the principles described herein, more preferably more than 48 hours after treatment, even more preferably more than seven days after treatment, and most preferably more than three weeks after treatment. Accordingly, the dusting material 22 may be treated with a solution of the invention as illustrated in FIG. 1 up to several weeks prior to the mass 30 being transported to a different location without a significant degradation in dusting reduction quality such that airborne dust emanation from the mass 30 remains eliminated or at the very least greatly reduced over the same mass 30 of an untreated dusting material and/or a dusting material treated with an alternative solution.

While the specific embodiments have been illustrated and described, numerous modifications come to mind without significantly departing from the spirit of the invention, and the scope of protection is only limited by the scope of the accompanying Claims.

What is claimed is:

1. A method of reducing airborne dust emanating from a plurality of fines of a dusting material comprising the steps of:
providing a source of an aqueous solution comprising a mixture of a water soluble non-ionic cellulose ether, a plasticizer, and one or more surfactants, wherein a percentage of the plasticizer in the aqueous solution is no more than 200 percent by weight of the non-ionic cellulose ether;
applying the aqueous solution to a dusting material comprising a plurality of fines while the dusting material is being transferred from a first location to a second location; and
mixing the dusting material with the aqueous solution to coat the plurality of fines with the aqueous solution to create a treated dusting material.

2. The method of claim 1 wherein the non-ionic cellulose ether has a viscosity between 3 cPs and 100,000 cPs as measured at a concentration of 2.5 weight percent in water.

3. The method of claim 2 wherein the non-ionic cellulose ether is a methylcellulose ether.

4. The method of claim 2 wherein the plasticizer is glycerin.

5. The method of claim 2 wherein a percentage of the non-ionic cellulose ether is no more than 20 percent by weight of the aqueous solution.

6. The method of claim 2 wherein a percentage of the non-ionic cellulose ether is no more than 20 percent by weight of the aqueous solution, and a percentage of the plasticizer is no more than 200 percent by the weight of the non-ionic cellulose ether.

7. The method of claim 2 further comprising the step of:
accumulating the plurality of fines of the treated dusting material into a mass of the treated dusting material subsequent to the applying step wherein the aqueous solution is distributed throughout an interior portion of the mass of the treated dusting material.

8. The method of claim 7 wherein the mixing step is performed simultaneously with the accumulating step.

9. The method of claim 1 wherein the aqueous solution further comprises a cross-linking agent.

10. The method of claim 9 wherein the cross-linking agent is selected from the group consisting of glyoxal, borates, and zirconium-salt based cross-linking systems.

11. A method of treating a plurality of fines of a dusting material to prevent emanation of dust from the dusting material comprising the steps of:
providing an aqueous solution comprising a mixture of soluble non-ionic cellulose ether, a plasticizer, and a surfactant, wherein a percentage of the plasticizer in the aqueous solution is no more than 200 percent by weight of the non-ionic cellulose ether;
applying the aqueous solution to a dusting material comprising a plurality of fines to create a treated dusting material while the dusting material is being transferred from a first location to a second location;
mixing the dusting material with the aqueous solution to coat the plurality of fines with the aqueous solution; and
accumulating the plurality of fines of the treated dusting material into a mass of the treated dusting material subsequent to the applying step wherein the aqueous solution is distributed throughout an interior portion of the mass of the treated dusting material.

12. The method of claim 11 wherein the non-ionic cellulose ether is an alkyl-substituted cellulose ether.

13. The method of claim 11 wherein the plasticizer is selected from the group of cellulose ether plasticizers consisting of polyols, diols, sugars, fatty acids, fatty acid esters, and polyhydridic alcohols.

14. The method of claim 11 wherein the surfactant is selected from the group consisting of solutions of salts of alkylbenzene sulfonates, dialkyl sulfosuccinates, fatty acid amides, quaternary ammonium compounds, organic phosphate esters, ethylene oxide-propylene oxide block copolymers, non-ionic fatty acid alcohol ethoxylates, non-ionic fatty acid alcohol mixed ethoxylate-propoxylates, synthetic alcohol ethoxylates, and synthetic alcohol mixed ethoxylate-propoxylates.

15. The method of claim 11 wherein the aqueous solution further comprises a cross-linking agent.

16. The method of claim 15 wherein the cross-linking agent is selected from the group consisting of glyoxal, borates, and zirconium-salt based cross-linking systems.

17. A method of treating a plurality of fines of a dusting material to prevent emanation of dust from the dusting material comprising the steps of:
providing an aqueous solution comprising a mixture of soluble non-ionic cellulose ether, a plasticizer, and a surfactant, wherein a percentage of the plasticizer in the aqueous solution is no more than 200 percent by weight of the non-ionic cellulose ether;
applying the aqueous solution to a dusting material comprising a plurality of fines to create a treated dusting material;
transferring the dusting material during the applying step wherein the dusting material is transferred from a first location to a second location as the aqueous solution is applied to the plurality of fines;
mixing the dusting material with the aqueous solution to coat the plurality of fines with the aqueous solution; and
accumulating the plurality of fines of the treated dusting material into a mass of the treated dusting material subsequent to the applying step wherein the aqueous solution is distributed throughout an interior portion of the mass of the treated dusting material.

18. The method of claim 17 wherein the plasticizer in the solution increases a particle-to-particle adhesion strength in the dusting material when the solution dries when compared to an untreated dusting material.

19. The method of claim 17 wherein the aqueous solution further comprises a cross-linking agent.

20. The method of claim 19 wherein the cross-linking agent is selected from the group consisting of glyoxal, borates, and zirconium-salt based cross-linking systems.

* * * * *